(12) United States Patent
Pan et al.

(10) Patent No.: US 8,657,538 B2
(45) Date of Patent: Feb. 25, 2014

(54) MILLING CUTTER

(75) Inventors: Wen Pan, Shenzhen (CN); Long Xu, Shenzhen (CN)

(73) Assignees: Hong Fu Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 197 days.

(21) Appl. No.: 13/223,505

(22) Filed: Sep. 1, 2011

(65) Prior Publication Data

US 2012/0195701 A1 Aug. 2, 2012

(30) Foreign Application Priority Data

Jan. 28, 2011 (CN) .......................... 2011 1 0031187

(51) Int. Cl.
*B23C 5/10* (2006.01)
*B23C 5/00* (2006.01)

(52) U.S. Cl.
USPC .............................................. 407/56; 407/61

(58) Field of Classification Search
USPC .................................... 407/56, 61, 63, 53, 54
See application file for complete search history.

(56) References Cited

U.S. PATENT DOCUMENTS

| | | | | |
|---|---|---|---|---|
| 4,285,618 A | * | 8/1981 | Shanley, Jr. | 407/54 |
| 4,497,600 A | * | 2/1985 | Kishimoto | 407/53 |
| 4,721,421 A | * | 1/1988 | Klinger | 407/63 |
| 4,770,567 A | * | 9/1988 | Moriarty | 407/59 |
| 4,810,136 A | * | 3/1989 | Paige | 407/54 |
| 6,164,876 A | * | 12/2000 | Cordovano | 407/59 |
| 6,435,780 B1 | * | 8/2002 | Flynn | 407/53 |
| 7,204,663 B2 | * | 4/2007 | Dov et al. | 407/53 |
| 8,366,354 B2 | * | 2/2013 | Davis | 407/59 |

FOREIGN PATENT DOCUMENTS

| CN | 201095010 Y | 8/2008 |
|---|---|---|
| CN | 101829803 A | 9/2010 |

* cited by examiner

*Primary Examiner* — Will Fridie, Jr.
(74) *Attorney, Agent, or Firm* — Altis Law Group, Inc.

(57) ABSTRACT

A cutter includes a cutter body, a first cutting portion and a second cutting portion. The first cutting portion is used for primary machining. The second cutting portion is used for precision machining, and is formed between the cutter body and the first cutting portion.

18 Claims, 2 Drawing Sheets

MILLING CUTTER

BACKGROUND

1. Technical Field

The present disclosure relates generally to a milling cutter and, more particularly, to a milling cutter, which can perform primary machining and precision machining at the same time.

2. Description of Related Art

In milling machining processes, in order to make a workpiece to obtain a surface with high quality, the workpiece may need to experience three machining processes, which includes a primary machining process, a first precision machining process, and a second precision machining process. In the first or second precision machining processes, a second milling cutter or a third milling cutter with a relatively low stock removal and a relatively high feed speed is employed to achieve a decreased roughness of the workpiece surface. During the two precision machining processes, the milling cutter should be alternated for usage, and a position of the newly assembled milling cutter should be adjusted to find a proper work point. Thus, it consumes more time to alternate between the different milling cutters and to adjust the positions of the milling cutters, and thus decreasing the working efficiency and the working precision.

Therefore, there is room for improvement within the art.

BRIEF DESCRIPTION OF THE DRAWINGS

The elements in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
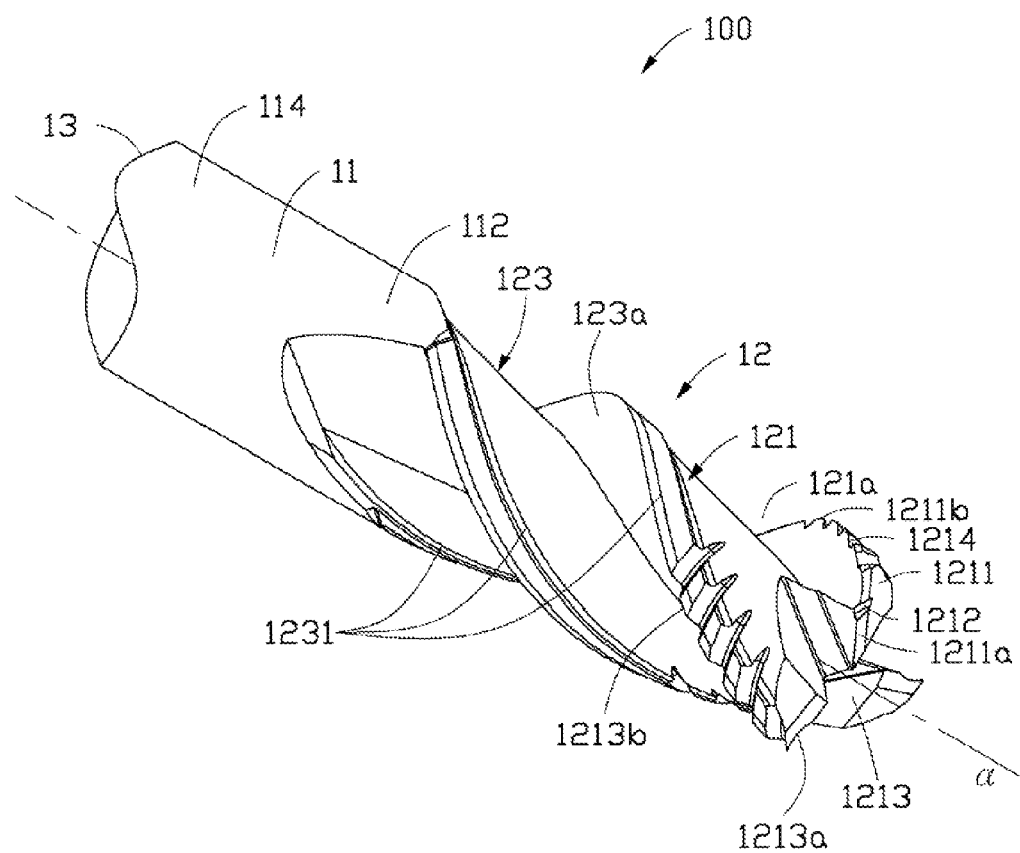
FIG. 1 is an isometric view of an embodiment of a cutter having a cutting portion.

Referring to FIG. 1, an embodiment of a cutter 100 includes a cutter body 11, a cutting portion 12, and a cutter handle 13.

In the illustrated embodiment, the cutter body 11 is substantially cylindrical, and defines a center axis α. In machining, the cutter body 11 rotates about the center axis α as a rotation axis. The cutter body 11 includes a first end 112 and a second end 114. The cutting portion 12 is formed in the first end 112, and the cutter handle 13 is formed in the second end 114.

The cutter handle 13 can be a straight shank or a tapered shank. The cutter handle 13 is used for connecting the cutter 100 to a main shaft of a numerical control machine (not shown), to maintain the stability of the cutter 100 during machining.

The cutting portion 12 includes a first cutting portion 121 and a second cutting portion 123. The first cutting portion 121, the second cutting portion 123, and the cutter body 11 are aligned in the center axis α. The first cutting portion 121 is adjacent to the second cutting portion 123 along the center axis α. A distance between the first cutting portion 121 and the cutter body 11 is greater than that between the second cutting portion 123 and the cutter body 11. A length of the first cutting portion 121 along the center axis α is equal to or slightly smaller than that of the second cutting portion 123. A cutting edge radius of the first cutting portion 121 is equal to or slightly greater than that of the second cutting portion 123. The first cutting portion 121 is used for primary machining, and the second cutting portion 123 is used for precision machining.

Figure 2:
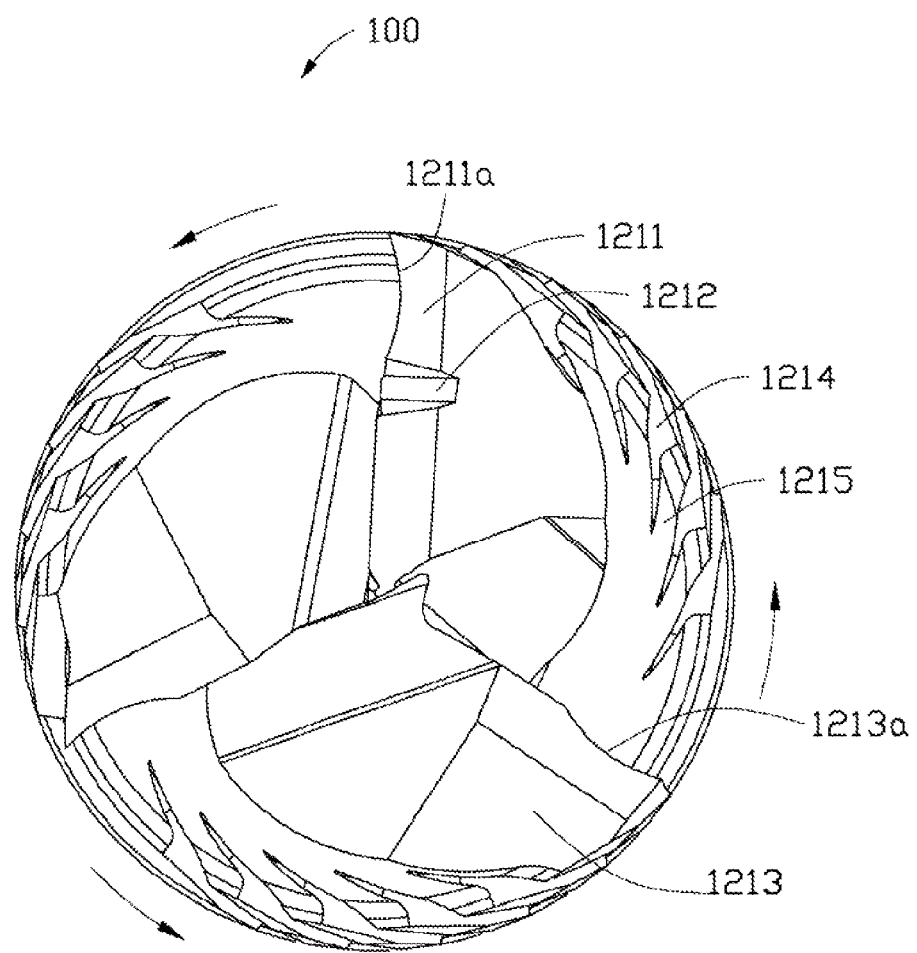
FIG. 2 is a top plane view of an end of the cutting portion of the cutter of FIG. 1.

In the illustrated embodiment, the first cutting portion 121 includes a lead cutting edge 1211 and two side cutting edges 1213. Referring also to FIG. 2, the lead cutting edge 1211 and the two side cutting edges 1213 are evenly arranged in an end surface along a circumferential direction of the first cutting portion 121, and are helically extended toward the cutter handle 13 along the center axis α. A helical first chip discharge groove 121a is defined between the lead cutting edge 1211 and the side cutting edges 1213, to facilitate the discharging of chips and dissipating of heat produced in primary machining. The lead cutting edge 1211 includes an end edge 1211a in an end surface thereof, and a circumferential edge 1211b connected to the end edge 1211a. A chip breaker groove 1212 is defined in the end edge 1211a. The chip breaker groove 1212 is substantially arcuate, to facilitate breaking chips, such that the chips are discharged effectively, and the heat is dissipated effectively. The circumferential edge 1211b extends helically along the center axis α. The circumferential edge 1211b includes a plurality of edge teeth 1214. A second chip discharge groove 1215 is formed between two adjacent edge teeth 1214, to further facilitate discharging of chips and dissipating of heat in primary machining. The side cutting edge 1213 includes an end edge 1213a and a circumferential edge 1213b connected to the end edge 1213a. The end edge 1213a is formed on an end surface of the first end 112 of the cutter body 11. A length of the end edge 1213a of the side cutting edge 1213 is smaller than that of the end edge 1211a of the lead cutting edge 1211. The circumferential edge 1213b has the same structure as the circumferential edge 1211b of the lead cutting edge 1211.

The second cutting portion 123 includes three precision cutting edges 1231. The three precision cutting edges 1231 helically extend from ends of the lead cutting edge 1211 and the two side cutting edges 1213 along the center axis α, respectively. A helical third chip discharge groove 123a is formed between the adjacent precision cutting edges 1231.

The first cutting portion 121, the second cutting portion 123 and the cutter body 11 are formed integrally, such that the cutter 100 is compact enough to satisfy the need for machining a workpiece with a small size.

When a workpiece is machined to form a penetrating slot, the first cutting portion 121 engages with the workpiece to drill; and after drilling, the cutter 100 moves along a direction perpendicular to the center axis α, such that a preformed slot is formed to complete a primary machining. After the primary machining, the cutter 100 is fed along the center axis α, and the second cutting portion 123 engages with an inner surface of the preformed slot. Thus, when the cutter 100 moves along a direction perpendicular to the center axis α, the inner surface of the preformed slot is precisely machined, such that the penetrating slot is formed in the workpiece.

Once a slot or a hole is formed in a workpiece by machining with the cutter 100, the process of alternating usage of a cutter or the re-positioning the workpiece is not needed, such that the work hours can be greatly decreased, and the working efficiency can be greatly increased. Moreover, because an error accumulation caused by re-positioning of the cutter can be avoided, the working precision can be greatly increased.

The quantity of the lead cutting edge 1211, the side cutting edge 1213, or the precision cutting edge 1231 can be changed according to a size or the manufacturing difficulty of the cutter 100, for example, the total number of the lead cutting edges 1211 can be two, four, or eight, and the total number of the side cutting edges 1213 can be two or four. The cutting edges can be arranged unevenly in the end surface along the circumferential direction. Shapes of the cutting edges can be changed according to a surface shape of a workpiece to be machined.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A cutter, comprising:
    a cutter body defining a center axis;
    a first cutting portion configured for primary machining, the first cutting portion comprising a lead cutting edge and at least one side cutting edge adjacent to the side cutting edge, a length of the lead cutting edge being greater than a length of the at least one side cutting edge along the center axis; and
    a second cutting portion configured for precision machining, wherein the second cutting portion is formed between the cutter body and the first cutting portion.

2. The cutter of claim 1, wherein the cutter body, the first cutting portion and the second cutting portion are aligned in the center axis, and the cutter body is rotatable about the center axis acting as a rotation axis.

3. The cutter of claim 1, wherein a length of the first cutting portion along the center axis is equal to or smaller than a length of the second cutting portion.

4. The cutter of claim 1, wherein the lead cutting edge and the at least one side cutting edge extend helically along the center axis.

5. The cutter of claim 1, wherein the lead cutting edge comprises an end edge in an end surface thereof, and a circumferential edge connected to the end edge, and the circumferential edge extends helically along the center axis.

6. The cutter of claim 5, wherein a chip breaker groove is defined in the end edge.

7. The cutter of claim 5, wherein the circumferential edge comprises a plurality of edge teeth, and a chip discharge groove is formed between two adjacent edge teeth.

8. The cutter of claim 1, wherein a number of the lead cutting edge is one, a number of the at least one side cutting edge is two, the second cutting portion comprises three precision cutting edges, and the three precision cutting edges extend from ends of the lead cutting edge and the two side cutting edges along the center axis, respectively.

9. The cutter of claim 8, wherein the three precision cutting edges helically extend along the center axis.

10. The cutter of claim 1, wherein a cutting edge radius of the first cutting portion is equal to or greater than a cutting edge radius of the second cutting portion.

11. A cutter, comprising:
    a cutter body defining a center axis, wherein the cutter body is rotatable about the center axis acting as a rotation axis;
    a first cutting portion configured for primary machining, the first cutting portion comprising a lead cutting edge and at least one side cutting edge adjacent to the side cutting edge, a length of the lead cutting edge being greater than a length of the at least one side cutting edge along the center axis; and
    a second cutting portion configured for precision machining, wherein the second cutting portion is formed between the cutter body and the first cutting portion, the cutter body, the first cutting portion and the second cutting portion are aligned in the center axis, and a cutting edge radius of the first cutting portion is equal to or greater than a cutting edge radius of the second cutting portion.

12. The cutter of claim 11, wherein a length of the first cutting portion along the center axis is equal to or smaller than a length of the second cutting portion.

13. The cutter of claim 11, wherein the lead cutting edge and the at least one side cutting edge extend helically along the center axis.

14. The cutter of claim 11, wherein the lead cutting edge comprises an end edge in an end surface thereof, and a circumferential edge connected to the end edge, and the circumferential edge extends helically along the center axis.

15. The cutter of claim 14, wherein a chip breaker groove is defined in the end edge.

16. The cutter of claim 14, wherein the circumferential edge comprises a plurality of edge teeth, and a chip discharge groove is formed between two adjacent edge teeth.

17. The cutter of claim 11, wherein a number of the lead cutting edge is one, a number of the at least one side cutting edge is two, the second cutting portion comprises three precision cutting edges, and the three precision cutting edges extend from ends of the lead cutting edge and the two side cutting edges along the center axis, respectively.

18. The cutter of claim 17, wherein the three precision cutting edges helically extend along the center axis.

* * * * *